United States Patent [19]
Bechtol

[11] 3,878,566
[45] Apr. 22, 1975

[54] PATELLO-FEMORAL PROSTHESIS

[75] Inventor: Charles O. Bechtol, Los Angeles, Calif.

[73] Assignee: Richards Manufacturing Company, Memphis, Tenn.

[22] Filed: May 8, 1974

[21] Appl. No.: 468,095

[52] U.S. Cl. .................................. 3/1.91; 128/92 C
[51] Int. Cl. .............................................. A61f 1/24
[58] Field of Search..... 3/1; 128/92 C, 92 CA, 92 R

[56] References Cited
UNITED STATES PATENTS
3,774,244  11/1973  Walker ........................................ 3/1
3,806,961  4/1974  Muller ........................................ 3/1

FOREIGN PATENTS OR APPLICATIONS
498,150  9/1954  Italy ................................ 128/92 CA
1,047,640  7/1953  France .............................. 128/92 C Primary Examiner—Ronald L. Frinks
Attorney, Agent, or Firm—John R. Walker, III

[57] ABSTRACT

Prosthesis means for replacing the articulating surfaces of the patello-femoral joint. The prosthesis means includes a femoral component for attachment to the patellar facet of the femur and includes a patellar component for attachment to the inner surface of the patella adjacent the patellar facet of the femur. The femoral component is provided with a trough-like indentation. The patellar component is provided with a crest-like ridge for coacting with the trough-like indentation of the femoral component to allow the femoral and patellar components to move relative to one another while staying in alignment with one another.

3 Claims, 10 Drawing Figures

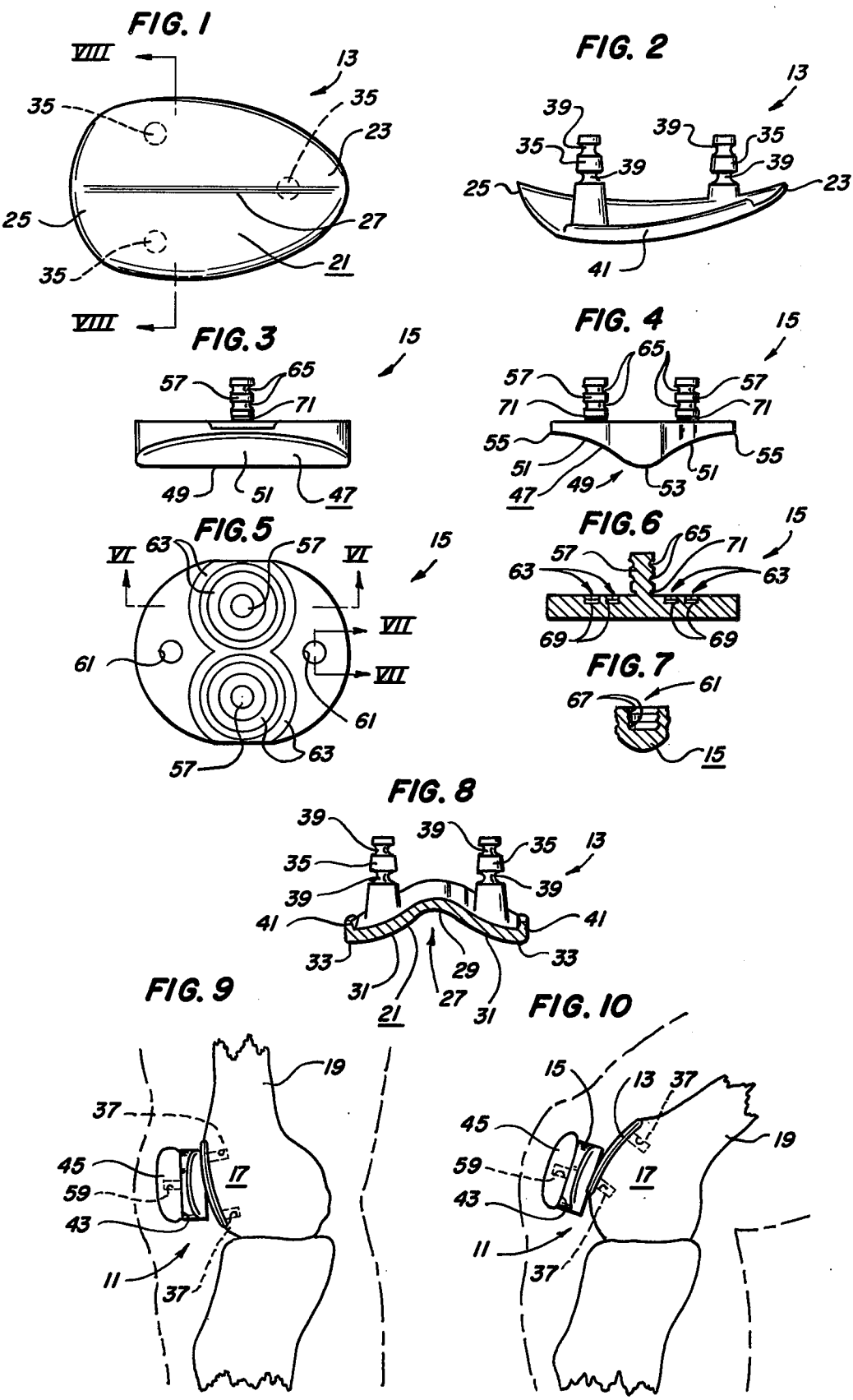

PATELLO-FEMORAL PROSTHESIS

BACKGROUND OF THE INVENTION

1. Field of the Invention

This invention relates generally to prostheses for use with knee joints and more specifically to patello-femoral prostheses.

2. Description of the Prior Art

Heretofore, various prostheses have been derived for use in treating defective knee joints. Bousquet (U.S. Pat. No. 3,696,446) and Moritz (U.S. Pat. No. 3,694,821) disclose "total" knee prostheses in which the joint between the femur and tibia is completely replaced. Link (U.S. Pat. No. 3,715,763) discloses a "partial" knee prosthesis in which only the articulating surfaces between the femur and tibia are replaced.

However, applicant knows of no prosthesis for use in replacing the articulating surfaces of the patello-femoral joint of the knee. It should be noted that Bousquet's prosthesis includes a guide plate 7 having a groove 7a for guiding the patella but does not provide for replacing the articulating surfaces of the patello-femoral joint. Since this device is one unit, the patellar component cannot be custom fitted to the patient.

The known prior prostheses for use with knee joints have been disadvantageous in that they have neglected the importance of the patello-femoral joint. By simply replacing the articulating surfaces between the femur and tibia as taught by Link or by replacing the complete joint between the femur and tibia as taught by Bousquet and Moritz without concern with the patello-femoral joint overlooks the pain and restricted motion in an area not necessarily affected by such replacements.

SUMMARY OF THE INVENTION

The present invention is directed towards overcoming the problems and disadvantages in prior knee joint prostheses. The concept of the present invention is to provide prosthesis means to replace the articulating surfaces of the patello-femoral joint for use either by itself or in conjunction with a tibiofemoral prosthesis thereby creating a true "total" knee joint prosthesis.

The prosthesis means of the present invention includes a femoral component for attachment to the patellar facet of the femur and includes a patellar component for attachment to the inner surface of the patella adjacent the patellar facet of the femur to coact with the femoral component and allow pain-free and unrestricted movement between the patella and the patellar facet of the femur without comprising the patellar ligamentation and with a minimum of bone removal required. The femoral component includes a face surface having a trough-like indentation and the patellar component includes a face surface having a crest-like ridge. The trough-like indentation of the femoral component coacts with the crest-like ridge of the patellar component to allow the patellar and femoral components to move relative to one another while remaining in alignment with each other and also discourages dislocation.

BRIEF DESCRIPTION OF THE DRAWINGS

FIG. 1 is a top plan view of the femoral component of the patello-femoral prosthesis of the present invention.

FIG. 2 is a side elevational view of the femoral component.

FIG. 3 is a side elevational view of the patellar component of the patello-femoral prosthesis of the present invention.

FIG. 4 is an end elevational view of the patellar component.

FIG. 5 is a bottom plan view of the patellar component.

FIG. 6 is a sectional view of the patellar component as taken on line VI—VI of FIG. 5.

FIG. 7 is a partial sectional view of the patellar component as taken on line VII—VII of FIG. 5.

FIG. 8 is a sectional view of the femoral component as taken on line VIII—VIII of FIG. 1.

FIG. 9 is a side elevational view of the prosthesis means of the present invention shown replacing the articulating surfaces of the patello-femoral joint with the joint in an unflexed position and with the outline of the leg in phantom lines.

FIG. 10 is a side elevational view of the prosthesis means similar to FIG. 9 but with the patello-femoral joint in a flexed position.

DESCRIPTION OF THE PREFERRED EMBODIMENT

The patello-femoral prosthesis means 11 of the present invention is for use in replacing the articulating surfaces of the patello-femoral joint in a human knee. The prosthesis means 11 comprises in general a femoral component 13 and a patellar component 15.

The femoral component 13 is for attachment to the patellar facet 17 of the femur 19. The femoral component 13 includes an outwardly directed face surface 21 having a first end 23 and a second end 25. The first end 23 is elongated. A trough-like indentation 27 is provided in the face surface 21 of the femoral component 13 extending from the first end 23 to the second end 25. However, the trough-like indentation 27 is preferably deeper and more pronounced than the normal trough-like indentation in the patellar facet of a healthy femur. This is to discourage and prevent dislocation of the patellar component. The bottom 29 of the trough-like indentation 27 of the femoral component 13 is convex and it extends from the first end 23 to the second end 25. Likewise, the sides 31 of the trough-like indentation 27 of the femoral component 13 are preferably convex as they extend from the bottom 29 of the trough-like indentation 27 to the top sides 33 thereof. The femoral component 13 includes anchoring means for fixedly anchoring the femoral component 13 to the patellar facet of the femur with the aid of a typical bone cement well known to those skilled in the art. The anchoring means includes a plurality of inwardly directed peg members 35 for extending into corresponding cavities 37 provided in the patellar facet 17 of the femur 19. Preferably, each peg member 35 is provided with a plurality of circumferential grooves 39 for increasing the fixation thereof. More specifically, the anchoring means preferably includes two peg members 35 adjacent the second end 25 of the face surface 21 of the femoral component 13 and includes one peg member 35 adjacent the first end 23 of the face surface 21 of the femoral component 13. Preferably, each of the pegs 35 is slightly tapered downwardly towards the distal end to provide a wedged tapered fit into the bone cement. In addition, the femoral component 13 includes inturned flange portions 41 along portions of the sides of the face surface 21 thereof for containing the bone cement beneath the femoral component 13 to increase the fixation thereof.

The patellar component 15 is for attachment to the inner surface 43 of the patella 45 adjacent the patellar facet 17 of the femur 19. The patellar component 15 includes an outwardly directed face surface 47 for coacting with the outwardly directed face surface 21 of the femoral component 13 to allow the femoral and patellar components 13, 15 to move relative to one another. The face surface 47 of the patellar component 15 includes a crest-like ridge 49 for coacting with the trough-like indentation 27 of the femoral component 13 to allow the femoral and patellar components 13, 15 to remain in alignment with each other as they move relative to one another. However, the crest-like ridge 49 of the patellar component 15 is preferably higher or more pronounced than the normal crest-like ridge in the inner surface of a healthy patella for coacting with the deeper than normal trough-like indentation 27 of the femoral component 13 to prevent any possible dislocation of the femoral and patellar components 13, 15 as they move relative to one another. It should be noted that the elongated first end 23 of the femoral component 13 allows the femoral and patellar components 13, 15 to be substantially moved relative to one another as the knee is flexed and still remain in coacting engagement with one another. Preferably, the sides 51 of the crest-like ridge of the patellar component 15 are concave as they extend from the top 53 of the crest-like ridge 49 to the bottom sides 55 thereof for coacting with the convex sides 31 of the trough-like indentation 27 of the femoral component 13. The patellar component 15 includes anchoring means for fixedly anchoring the patellar component 15 to the inner surface 43 of the patella 45 adjacent the patellar facet 17 of the femur 19 with the aid of bone cement. The anchoring means preferably includes a plurality of inwardly directed peg members 57 for extending into corresponding cavities 59 provided in the patella 45, a plurality of cavities 61 in the patellar component 15 opposite the face surface 47 for allowing the bone cement to extend into the patellar component 15, and a plurality of circular channels 63 in the patellar component 15 around each of the peg members 57 for allowing the bone cement to extend into the patellar component 15. More specifically, the anchoring means preferably includes two spaced-apart cavities 61, and two spaced-apart channels 63 around each of the peg members 57. Preferably, each of the peg members 57 is provided with a plurality of circumferential grooves 65 for increasing the fixation thereof. Likewise, each cavity 61 is preferably provided with undercut portions 67 for increasing the fixation thereof. Also, each channel 63 is preferably provided with an undercut portion 69 for increasing the fixation thereof.

The construction of the prosthesis means 11 of the present invention is quite simple. Preferably, the femoral component 13 is a one-piece construction composed of a metallic material such as stainless steel or chromium cobalt alloy. The patellar component 15 is preferably a one-piece construction composed of an ultra-high molecular weight polyethylene. It should be noted that each peg member 57 of the patella component 15 is preferably provided with a marker 71 of stainless steel or chromium cobalt marker wire or the like to provide an accurate reference for radiographic determination of position and wear rates of the patella component 15. The size of the femoral component 13 and patellar component 15 may be varied to accomodate anatomical variations encountered. However, applicant has determined that one size femoral component 13 and three sizes of patellar components 15 (i.e., small, medium and large) will accomodate the majority of anatomical variations encountered.

To replace the articulating surfaces of the patello-femoral joint with the prosthesis means 11 of the present invention, an incision is first made to allow access to the patella 45 and patellar facet 17 of the femur 19 by means and methods well known to those skilled in the art. The patella 45 is then retracted to expose the patellar facet 17 of the femur 19. The patellar facet 17 is then contoured by well known means to properly accomodate the femoral component 13. Next, the patella 45 is further retracted so that its inner surface 43 is exposed. A portion of the inner surface 43 of the patella 45 is removed so that the patella 45 can properly accomodate the patellar component 15. The femoral component 13 is then fixedly anchored to the patellar facet 17 of the femur 19 with the aid of bone cement. Likewise, the patellar component 15 is fixedly anchored to the inner surface 43 of the patella 45 with the aid of bone cement. The incision is then closed in the manner well known to those skilled in the art.

As thus constructed and used, the present invention provides a prosthesis means that replaces the articulating surfaces of the patello-femoral joint in a knee to allow pain free and unrestricted movement of the patella 45 relative to the patellar facet 17 of the femur 19 without compromising the patellar ligamentation and with a minimum of bone removal required.

Although the invention has been described and illustrated with respect to a preferred embodiment thereof, it is not to be so limited since changes and modifications may be made therein which are within the full intended scope of the invention.

I claim:

1. Patello-femoral prosthesis means for replacing the articulating surfaces of the patello-femoral joint, said prosthesis means comprising:

a. a femoral component for attachment to the patellar facet of the femur, said femoral component including a face surface having a trough-like indentation, said trough-like indentation being deeper than the normal trough-like indentation in the patellar facet of a healthy femur, said face surface including a first end and a second end, said first end being elongated, said trough-like indentation extending from said first end to said second end, the bottom of said trough-like indentation of said femoral component being convex as it extends from said first end to said second end, the sides of said trough-like indentation of said femoral component being convex as they extend from the bottom of said trough-like indentation to the top sides thereof; and b. a patellar component for attachment to the inner surface of the patella adjacent the patellar facet of the femur to coact with said femoral component, said patellar component including a face surface having a crest-like ridge for coacting with said trough-like indentation of said femoral component to allow said patellar and femoral components to move relative to one another while remaining in alignment with each other, said crest-like ridge being higher than the normal crest-like ridge in the inner surface of a healthy patella for preventing any possible dislocation of said femoral and patellar components as they move relative to one another, the sides of said crest-like ridge of said patellar component being concaved as they extend from the top of said crest-like ridge to the bottom sides thereof for coacting with the convex sides of said femoral component.

2. Patello-femoral prosthesis means for replacing the articulating surfaces of the patello-femoral joint, said prosthesis means comprising:

a. a femoral component for attachment to the patellar facet of the femur; said femoral component including a face surface having first and second ends and having a trough-like indentation extending from said first end to said second end, said trough-like indentation being deeper than the normal trough-like indentation in the patellar facet of a healthy femur, the bottom of said trough-like indentation being convex as it extends from said first end to said second end, the sides of said trough-like indentation being convex as they extend from the bottom of said trough-like indentation to the top thereof; said femoral component including anchoring means for fixedly anchoring said femoral component to the patellar facet of the femur, said anchoring means including a plurality of peg members for extending into corresponding cavities provided in the patellar facet of the femur, each of said peg members having a plurality of circumferential grooves for increasing the fixation thereof; said femoral component including inturned flange portions along the sides of said face surface thereof for increasing the fixation thereof; and b. a patellar component for attachment to the inner surface of the patella adjacent the patellar facet of the femur to coact with said femoral component; said patellar component including a face surface having a crest-like ridge, said crest-like ridge being higher than the normal crest-like ridge in the inner surface of a healthy patella to coact with said trough-like indentation of said femoral component for allowing said patella and femoral components to move relative to one another while remaining in alignment with each other and for preventing any possible dislocation of said femoral and patellar components as they move relative to one another, the sides of said crest-like ridge being concaved as they extend from the top of said crest-like ridge to the bottom thereof for coacting with the convex sides of said femoral component; said patellar component including anchoring means for fixedly anchoring said patellar component to the inner surface of the patella adjacent the patellar facet of the femur, said anchoring means including a plurality of peg members for extending into corresponding cavities provided in the patella, each of said peg members having a plurality of circumferential grooves for increasing the fixation thereof, said anchoring means including a plurality of cavities provided in said patellar component, each of said cavities having a plurality of undercut portions for increasing the fixation thereof, said anchoring means including a plurality of channels in said patellar component around each of said peg members, each of said channels having an undercut portion for increasing the fixation thereof.

3. The prosthesis means of claim 2 in which said femoral component is composed of a metallic material and in which said patellar component is composed of an ultra-high molecular weight polyethylene.

* * * * *